United States Patent
Inomata (10) Patent No.: US 9,530,018 B2
(45) Date of Patent: Dec. 27, 2016

(54) INFORMATION PROCESSING APPARATUS, INFORMATION PROCESSING SYSTEM, AND NON-TRANSITORY COMPUTER READABLE MEDIUM FOR OUTPUTTING ENCRYPTION KEY ON PAPER

(71) Applicant: FUJI XEROX CO., LTD., Minato-ku, Tokyo (JP)

(72) Inventor: Kohshiro Inomata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 18 days.

(21) Appl. No.: 14/478,663

(22) Filed: Sep. 5, 2014

(65) Prior Publication Data
US 2015/0220752 A1 Aug. 6, 2015

(30) Foreign Application Priority Data

Feb. 5, 2014 (JP) ................................ 2014-020756

(51) Int. Cl.
*H04L 29/06* (2006.01)
*G06F 21/62* (2013.01)
(Continued)

(52) U.S. Cl.
CPC ......... *G06F 21/6209* (2013.01); *G06F 21/606* (2013.01); *H04L 63/0428* (2013.01);
(Continued)

(58) Field of Classification Search
CPC .. G06F 21/6209; G06F 21/606; H04N 1/4486; H04L 67/10; H04L 63/102; H04L 63/0428; H04L 67/06
(Continued)

(56) References Cited

U.S. PATENT DOCUMENTS

2004/0205476 A1* 10/2004 Long ...................... G06Q 10/10
715/205
2005/0097335 A1* 5/2005 Shenoy ................. G06F 21/608
713/182
(Continued)

FOREIGN PATENT DOCUMENTS

JP 11-096120 A 4/1999
JP 2008-052537 A 3/2008

OTHER PUBLICATIONS

Baris Ege, "Memory Encryption for smart cards," IFIP International Federation for Information Processing 2011, pp. 199-216.*
(Continued)

*Primary Examiner* — Luu Pham
*Assistant Examiner* — Canh Le
(74) *Attorney, Agent, or Firm* — Sughrue Mion, PLLC (57) ABSTRACT

An information processing apparatus includes a file acquiring unit, a generating unit, a data processing unit, and an output unit. The file acquiring unit acquires a file on the basis of an instruction from a user. The generating unit generates restriction information for restricting access to the file acquired by the file acquiring unit. The data processing unit associates the restriction information generated by the generating unit with the file acquired by the file acquiring unit. The output unit outputs the restriction information generated by the generating unit on a paper medium.

13 Claims, 8 Drawing Sheets

(51) Int. Cl.
  *H04L 29/08* (2006.01)
  *H04N 1/44* (2006.01)
  *G06F 21/60* (2013.01)
(52) U.S. Cl.
  CPC ............ *H04L 63/102* (2013.01); *H04L 67/06* (2013.01); *H04L 67/10* (2013.01); *H04N 1/4486* (2013.01)
(58) Field of Classification Search
  USPC ........................................................ 713/150
  See application file for complete search history.

(56) References Cited

U.S. PATENT DOCUMENTS

2010/0188687 A1\* 7/2010 Fukano ................. G06F 3/1204
  358/1.15
2011/0113340 A1\* 5/2011 Miyazawa .............. G06F 9/445
  715/736
2013/0044881 A1\* 2/2013 Chang ................... H04L 9/0819
  380/278

OTHER PUBLICATIONS

Fei Chen, "Privacy-Preserving Cross-Domain Network Reachability Qualification," IEEE, 2011, pp. 155-164.\*

\* cited by examiner

INFORMATION PROCESSING APPARATUS, INFORMATION PROCESSING SYSTEM, AND NON-TRANSITORY COMPUTER READABLE MEDIUM FOR OUTPUTTING ENCRYPTION KEY ON PAPER

CROSS-REFERENCE TO RELATED APPLICATIONS

This application is based on and claims priority under 35 USC 119 from Japanese Patent Application No. 2014-020756 filed Feb. 5, 2014.

BACKGROUND (i) Technical Field

The present invention relates to an information processing apparatus, an information processing system, and a non-transitory computer readable medium.

(ii) Related Art

In recent years, there is a problem of leakage of data due to loss of information equipment and an occurrence of damage to the information equipment caused by malware, such as computer virus.

SUMMARY

According to an aspect of the invention, there is provided an information processing apparatus including a file acquiring unit, a generating unit, a data processing unit, and an output unit. The file acquiring unit acquires a file on the basis of an instruction from a user. The generating unit generates restriction information for restricting access to the file acquired by the file acquiring unit. The data processing unit associates the restriction information generated by the generating unit with the file acquired by the file acquiring unit. The output unit outputs the restriction information generated by the generating unit on a paper medium.

BRIEF DESCRIPTION OF THE DRAWINGS

Exemplary embodiments of the present invention will be described in detail based on the following figures, wherein.

DETAILED DESCRIPTION

Exemplary embodiments of the present invention will herein be described with reference to the attached drawings. The same reference numerals are used to identify the same components or similar components in the drawings. A duplicated description of such components is omitted herein.

Figure 1:
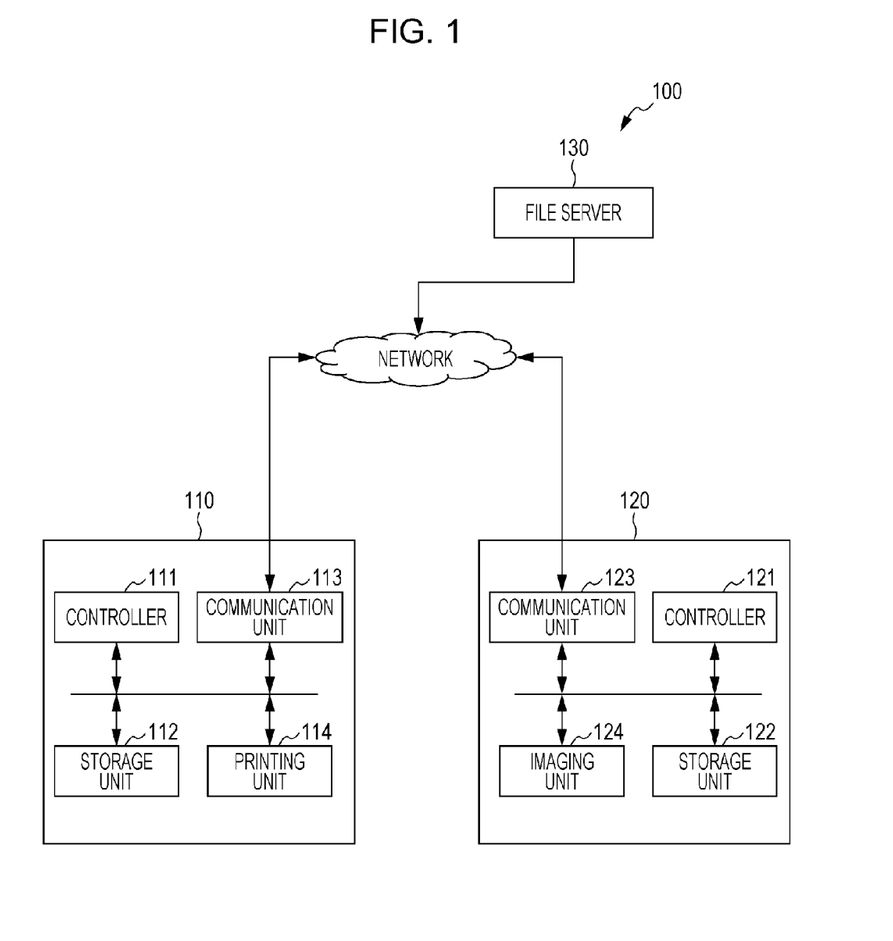
FIG. 1 is a diagram illustrating an exemplary hardware configuration of an information processing system according to an exemplary embodiment.

FIG. 1 is a diagram for description of an outline of a hardware configuration of an information processing system according to an exemplary embodiment. Referring to FIG. 1, an information processing system 100 includes an information processing apparatus 110, a user terminal 120, and a file server 130. The information processing apparatus 110, the user terminal 120, and the file server 130 are connected to a network, such as the Internet.

The information processing apparatus 110 includes a controller 111, a storage unit 112, a communication unit 113, and a printing unit 114. The controller 111 is, for example, a central processing unit (CPU) and operates in accordance with programs stored in the storage unit 112 to execute each process performed by the information processing apparatus 110. The storage unit 112 is, for example, a read only memory (ROM) or a hard disk and holds the programs executed by the controller 111. The communication unit 113 is a network interface and transmits and receives information over the network in accordance with an instruction from the controller 111. The printing unit 114 forms an image on a recording medium, such as a sheet of paper, with an electrophotographic method or the like. The printing unit 114 may be included in an apparatus that is separated from the information processing apparatus 110 and that is connected to the information processing apparatus 110 directly or over the network.

The user terminal 120 is an information terminal used by a user. The user terminal 120 includes a controller 121, a storage unit 122, a communication unit 123, and an imaging unit 124. The controller 121 is, for example, a CPU and operates in accordance with programs stored in the storage unit 122 to execute each process performed by the user terminal 120. The storage unit 122 is, for example, a ROM or a hard disk and holds the programs executed by the controller 121. The communication unit 123 is a network interface and transmits and receives information over the network in accordance with an instruction from the controller 121. The imaging unit 124 is, for example, a camera and acquires an image.

The file server 130 (a storage unit) stores electronic data and may be a data server called a so-called cloud server. The file server 130 is the data server which both the information processing apparatus 110 and the user terminal 120 are capable of accessing over the network.

The programs processed by the controller 111 and the controller 121 may be provided via a computer-readable information storage medium, such as an optical disk, a magnetic disk, a magnetic tape, a magneto-optical disk, or a flash memory, or may be provided via a communication system, such as the Internet.

Figure 2:
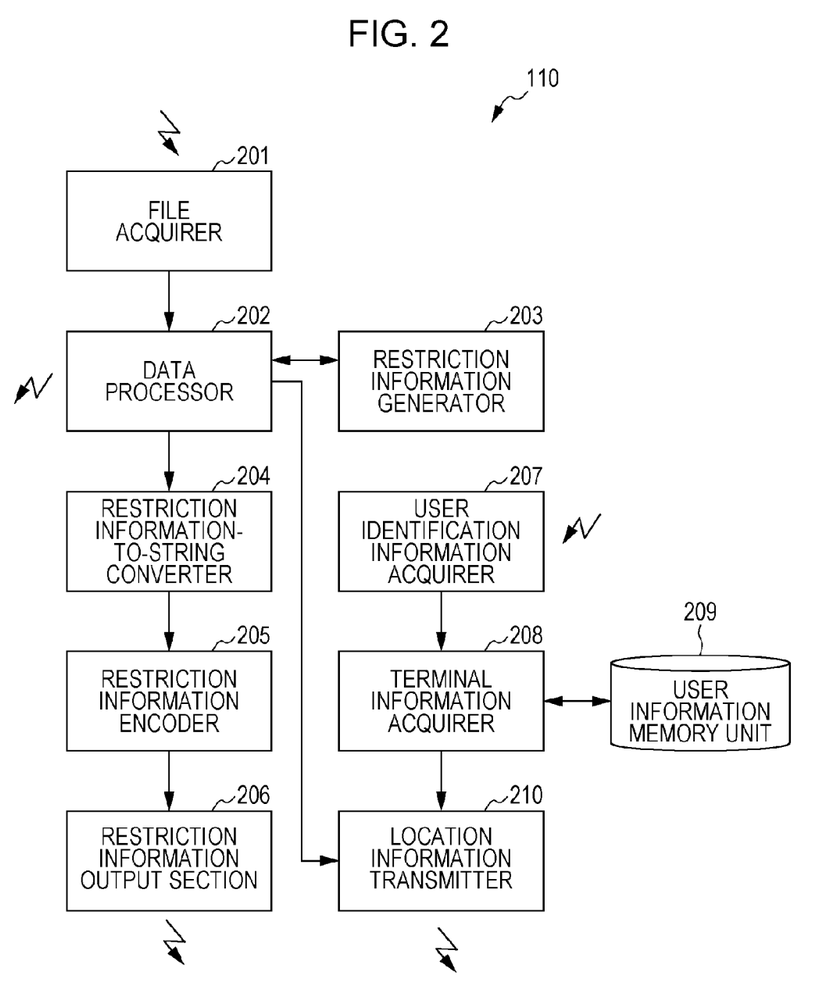
FIG. 2 is a diagram illustrating exemplary functions realized by an information processing apparatus.

Functions realized by the information processing apparatus 110 will now be described. FIG. 2 is a diagram for description of the functions realized by the information processing apparatus 110. Referring to FIG. 2, the information processing apparatus 110 functionally includes, for example, a file acquirer 201, a data processor 202, a restriction information generator 203, a restriction information-to-string converter 204, a restriction information encoder 205, a restriction information output section 206, a user identification information acquirer 207, a terminal information acquirer 208, a user information memory unit 209, and a location information transmitter 210.

The file acquirer 201 acquires a file on the basis of an instruction from the user. The file may be acquired from the files that are stored in the information processing apparatus 110 or an information device connected to the information processing apparatus 110 directly or over the network or may be acquired from the files that are acquired by the information processing apparatus 110 or an image file acquisition apparatus, such as a scanner, connected to the information processing apparatus 110 directly or over the network. The file acquirer 201 supplies the acquired file to the data processor 202.

Upon acquisition of the file from the file acquirer 201, the data processor 202 requests the restriction information generator 203 to generate restriction information to restrict access to the acquired file.

Upon acquisition of the request to generate the restriction information from the data processor 202, the restriction information generator 203 generates the restriction information. The restriction information is exemplified by an encryption key used for encrypting the file in the following description. Specifically, the restriction information generator 203 generates the encryption key composed of random values with a common random number generation technology. A 128-bit random number sequence or higher is desirably generated as the encryption key. The encryption key is electronic data of a binary data format. The restriction information generator 203 supplies the generated encryption key to the data processor 202.

The data processor 202 associates the encryption key supplied from the restriction information generator 203 with the file supplied from the file acquirer 201. Specifically, the data processor 202 encrypts the file supplied from the file acquirer 201 with the encryption key generated by the restriction information generator 203. The encryption may be performed with, for example, a common Advanced Encryption Standard (AES) method. In addition, the data processor 202 stores the encrypted file in the file server 130 connected to the information processing apparatus 110 over the network and supplies location information indicating the location of the encrypted file to the location information transmitter 210 described below in association with the file name. Specifically, the data processor 202 supplies the file name of the encrypted file and address information (for example, a Uniform Resource Locator (URL)) indicating the location where the encrypted file is stored in the file server 130 to the location information transmitter 210. Furthermore, the data processor 202 supplies the encryption key supplied from the restriction information generator 203 to the restriction information-to-string converter 204 in association with the file name of the file supplied from the file acquirer 201.

The restriction information-to-string converter 204 converts the encryption key supplied from the data processor 202 into a character string. Specifically, the restriction information-to-string converter 204 converts the encryption key supplied from the data processor 202 into a character string with a common method, such as Base64 encode. The encryption key, which is binary data supplied from the data processor 202, is converted into text data through the conversion into the character string. The restriction information-to-string converter 204 converts the encryption key supplied from the data processor 202 into a character string and supplies the encryption key converted into the character string to the restriction information encoder 205.

The restriction information encoder 205 encodes the encryption key that is supplied from the restriction information-to-string converter 204 and that is converted into the character string. Specifically, the restriction information encoder 205 encodes the encryption key that is supplied from the restriction information-to-string converter 204 and that is converted into the character string with a common technology. In the present exemplary embodiment, the restriction information encoder 205 converts the encryption key that is converted into the character string into, for example, a Quick Response (QR) code (registered trademark). The encoding is not specifically limited as long as the encryption key is converted into any visualized code. The encryption key is not necessarily converted into the QR code and, for example, may be converted into a barcode or a Micro Gradation (MIG) code. The restriction information encoder 205 encodes the encryption key that is supplied from the restriction information-to-string converter 204 and that is converted into the character string and supplies the encoded encryption key to the restriction information output section 206.

The restriction information output section 206 outputs the encoded encryption key supplied from the restriction information encoder 205 on a paper medium. Specifically, for example, the restriction information output section 206 instructs the printing unit 114 to print the encoded encryption key (QR code).

Figure 3:
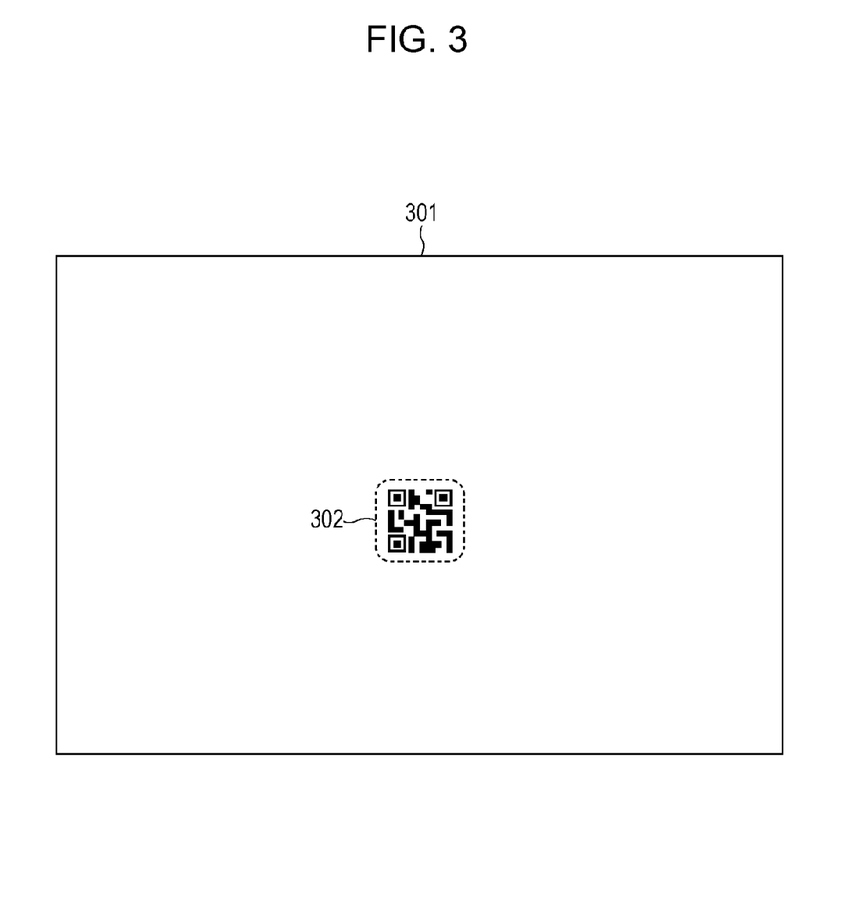
FIG. 3 illustrates an exemplary encryption key output on a paper medium.

FIG. 3 illustrates an example of the encryption key output on a paper medium. Referring to FIG. 3, an encoded encryption key 302 (QR code) is printed on a paper medium 301. The paper medium 301 on which the encryption key 302 is printed is acquired by the user operating the information processing apparatus 110 to be stored.

Referring back to FIG. 2, the functions realized by the information processing apparatus 110 will be further described. The user identification information acquirer 207 acquires user identification information for identifying the user on the basis of an instruction from the user. Specifically, the user identification information acquirer 207 acquires the user identification information, for example, when the user holds an integrated circuit (IC) tag or chip on which the user identification information for identifying the user is written over an IC tag or chip reader connected to the information processing apparatus 110. The user identification information is information (for example, an identification (ID) number) which is added to the user in advance and which uniquely identifies the user. The acquisition of the user identification information may not necessarily be performed in the mode in which the information written on the IC tag or chip is read out. A code (QR code or barcode) resulting from encoding of the user identification information may be read out with a code reader or the user may directly input the user identification information into the information processing apparatus 110. The user identification information acquirer 207 supplies the acquired user identification information to the terminal information acquirer 208.

The terminal information acquirer 208 acquires terminal information about the user terminal 120 on the basis of the user identification information supplied from the user identification information acquirer 207. Specifically, the terminal information acquirer 208 acquires the terminal information about the user terminal 120 carried by the user corresponding to the user identification information from the user information memory unit 209 in which the user identification information is stored in association with the terminal information. The user information memory unit 209 may be included in the information processing apparatus 110 or may be provided outside the information processing apparatus 110 to be connected to the information processing apparatus 110 over the network. The terminal information includes information about, for example, an electronic mail address available to the user terminal 120. The terminal information acquirer 208 supplies the acquired terminal information to the location information transmitter 210.

The location information transmitter 210 transmits the location information supplied from the data processor 202 to the user terminal 120 on the basis of the terminal information supplied from the terminal information acquirer 208. Specifically, the location information transmitter 210 transmits the location information to the electronic mail address of the user terminal 120 included in the terminal information. In the mail to be transmitted, the file name of the encrypted file is included in a subject field and the location information indicating the location where the encrypted file is stored is included in a text field.

Figure 4:
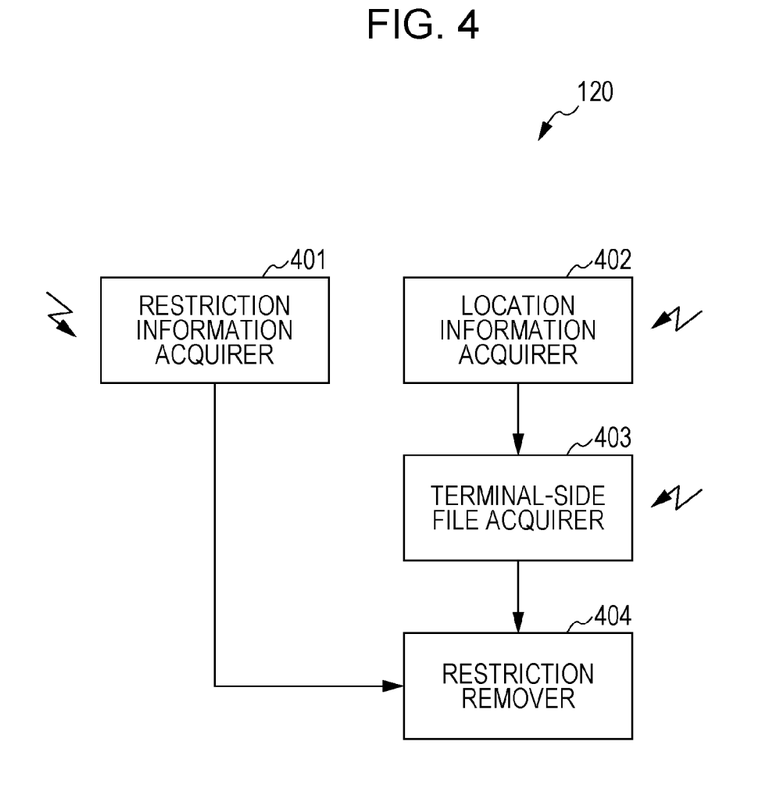
FIG. 4 is a diagram illustrating exemplary functions realized by a user terminal.

Functions realized by the user terminal 120 will now be described. FIG. 4 is a diagram for description of the functions realized by the user terminal 120. Referring to FIG. 4, the user terminal 120 functionally includes, for example, a restriction information acquirer 401, a location information acquirer 402, a terminal-side file acquirer 403, and a restriction remover 404.

The restriction information acquirer 401 acquires the restriction information (the encryption key here) on the basis of an instruction from the user. Specifically, when the user captures an image of the encoded encryption key 302 (QR code) which is printed on the paper medium 301 output from the information processing apparatus 110 with the imaging unit 124 provided in the user terminal 120, the restriction information acquirer 401 decrypts the encryption key from the encoded encryption key 302 the image of which is captured. Specifically, the restriction information acquirer 401 performs decryption processes for the respective processes performed in the restriction information encoder 205 and the restriction information-to-string converter 204 in the information processing apparatus 110 to the encoded encryption key 302 that is acquired to decrypt the encryption key. The restriction information acquirer 401 supplies the acquired encryption key to the restriction remover 404.

The location information acquirer 402 acquires the location information. Specifically, the location information acquirer 402 acquires the location information transmitted from the location information transmitter 210 in the information processing apparatus 110 via the communication unit 123. The location information acquirer 402 supplies the acquired location information to the terminal-side file acquirer 403.

The terminal-side file acquirer 403 acquires the encrypted file on the basis of the location information supplied from the location information acquirer 402. Specifically, the terminal-side file acquirer 403 accesses the file server 130 via the communication unit 123 with reference to the address information (for example, the URL) about the location where the encrypted file is stored, which is included in the location information, to acquire the encrypted file. The terminal-side file acquirer 403 supplies the acquired encrypted file to the restriction remover 404.

The restriction remover 404 removes the restriction of access to the encrypted file supplied from the terminal-side file acquirer 403 on the basis of the encryption key supplied from the restriction information acquirer 401. Specifically, the restriction remover 404 decodes the encrypted file supplied from the terminal-side file acquirer 403 with the encryption key supplied from the restriction information acquirer 401. In the decoding, the decryption process for the process performed in the data processor 202 in the information processing apparatus 110 is performed.

Figure 5:
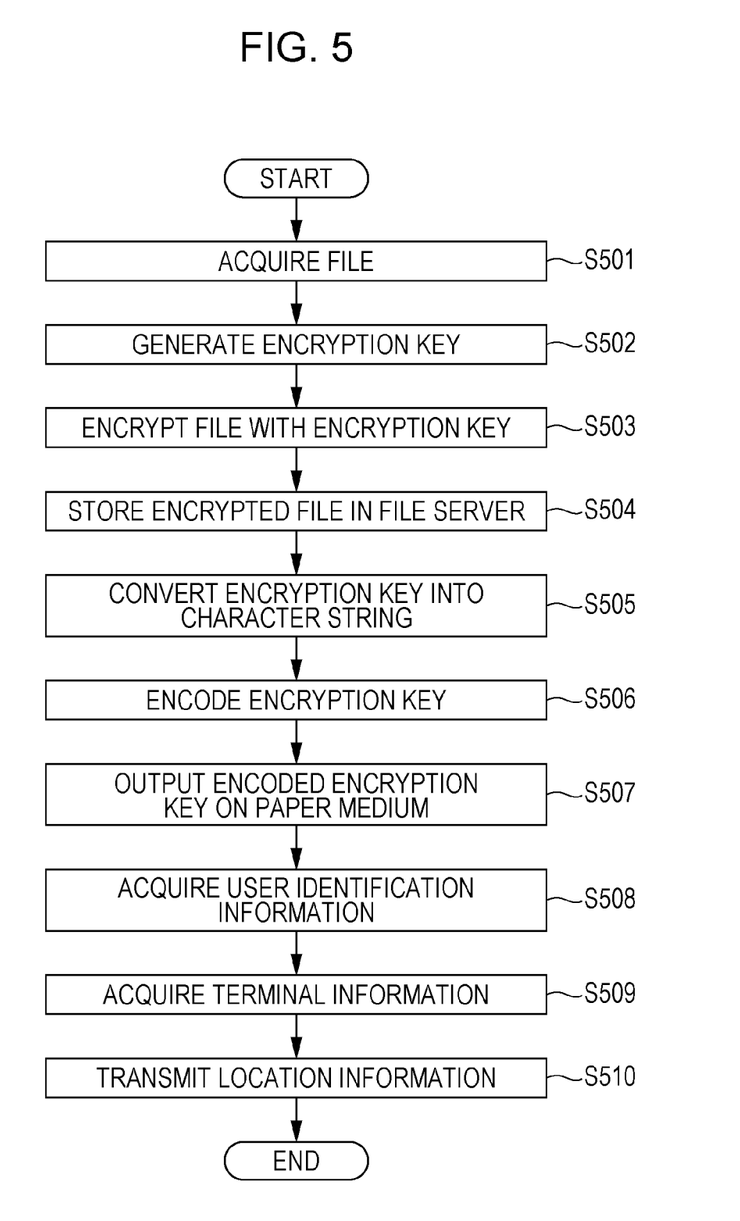
FIG. 5 is a flowchart illustrating an exemplary process in the information processing apparatus.

An outline of a processing flow in the information processing apparatus 110 in the present exemplary embodiment will now be described. FIG. 5 is a flowchart illustrating an exemplary process in the information processing apparatus 110. The processing flow from the time when the information processing apparatus 110 acquires the file to the time when the information processing apparatus 110 finishes the output of the encoded encryption key 302 on the paper medium 301 is illustrated in FIG. 5.

Referring to FIG. 5, in Step S501, the file acquirer 201 acquires a file. In Step S502, the restriction information generator 203 generates the encryption key.

In Step S503, the data processor 202 encrypts the file using the encryption key. In Step S504, the data processor 202 stores the encrypted file in the file server 130.

In Step S505, the restriction information-to-string converter 204 converts the encryption key into a character string. In Step S506, the restriction information encoder 205 encodes the encryption key converted into the character string. In Step S507, the restriction information output section 206 outputs (prints) the encoded encryption key 302 (for example, the QR code) on the paper medium 301.

In Step S508, the user identification information acquirer 207 acquires the user identification information on the basis of an instruction from the user. In Step S509, the terminal information acquirer 208 acquires the terminal information from the user information memory unit 209 in which the terminal information associated with the user identification information is stored. In Step S510, the location information transmitter 210 transmits the location information (for example, the URL) indicating the location of the encrypted file on the basis of the terminal information. Upon transmission of the location information, the process in FIG. 5 is terminated.

Figure 6:
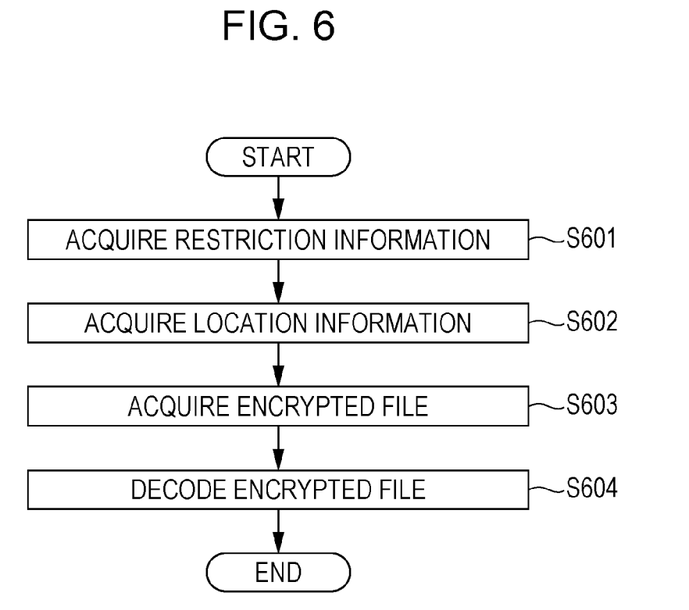
FIG. 6 is a flowchart illustrating an exemplary process in the user terminal.

An outline of a processing flow in the user terminal 120 in the present exemplary embodiment will now be described. FIG. 6 is a flowchart illustrating an exemplary process in the user terminal 120. The processing flow from the time when the user terminal 120 acquires the encoded encryption key 302 and the location information to the time when the user terminal 120 finishes the decoding of the encrypted file is illustrated in FIG. 6.

Referring to FIG. 6, in Step S601, the restriction information acquirer 401 performs the decryption processes for the respective processes performed in the restriction information encoder 205 and the restriction information-to-string converter 204 in the information processing apparatus 110 to the encoded encryption key 302 (for example, the QR code) acquired on the basis of the instruction from the user to acquire the encryption key. In Step S602, the location information acquirer 402 acquires the location information (for example, the URL) transmitted from the location information transmitter 210 in the information processing apparatus 110.

In Step S603, the terminal-side file acquirer 403 accesses the file server 130 in which the encrypted file is stored on the basis of the location information to acquire the encrypted file. In Step S604, the restriction remover 404 decodes the encrypted file with the encryption key. Upon decoding of the encrypted file, the process in FIG. 6 is terminated.

According to the information processing apparatus 110 of the present exemplary embodiment, the encryption key used for encrypting the file is output on the paper medium 301 in a mode that is not electronic data. Accordingly, the encryption key that is not electronic data is separated from the encrypted file, which is electronic data.

Exemplary Modification

The case is described in the above exemplary embodiment in which the encryption key used for the encrypting the file, which is converted into a character string and is encoded, is output on the paper medium 301. In an exemplary modification, a case will be described in which dummy keys, which are encryption keys (false keys) that are separated from the encryption key used for encrypting the file, are further generated and the encryption keys resulting from division, conversion into character strings, and encoding of the encryption keys including the dummy keys are output on the paper medium 301. Also in the present exemplary modification, the restriction information is the encryption key, as in the above exemplary embodiment. In order to avoid duplication of the description, portions different from those in the above exemplary embodiment will be mainly described in the description of the present exemplary modification.

Figure 7:
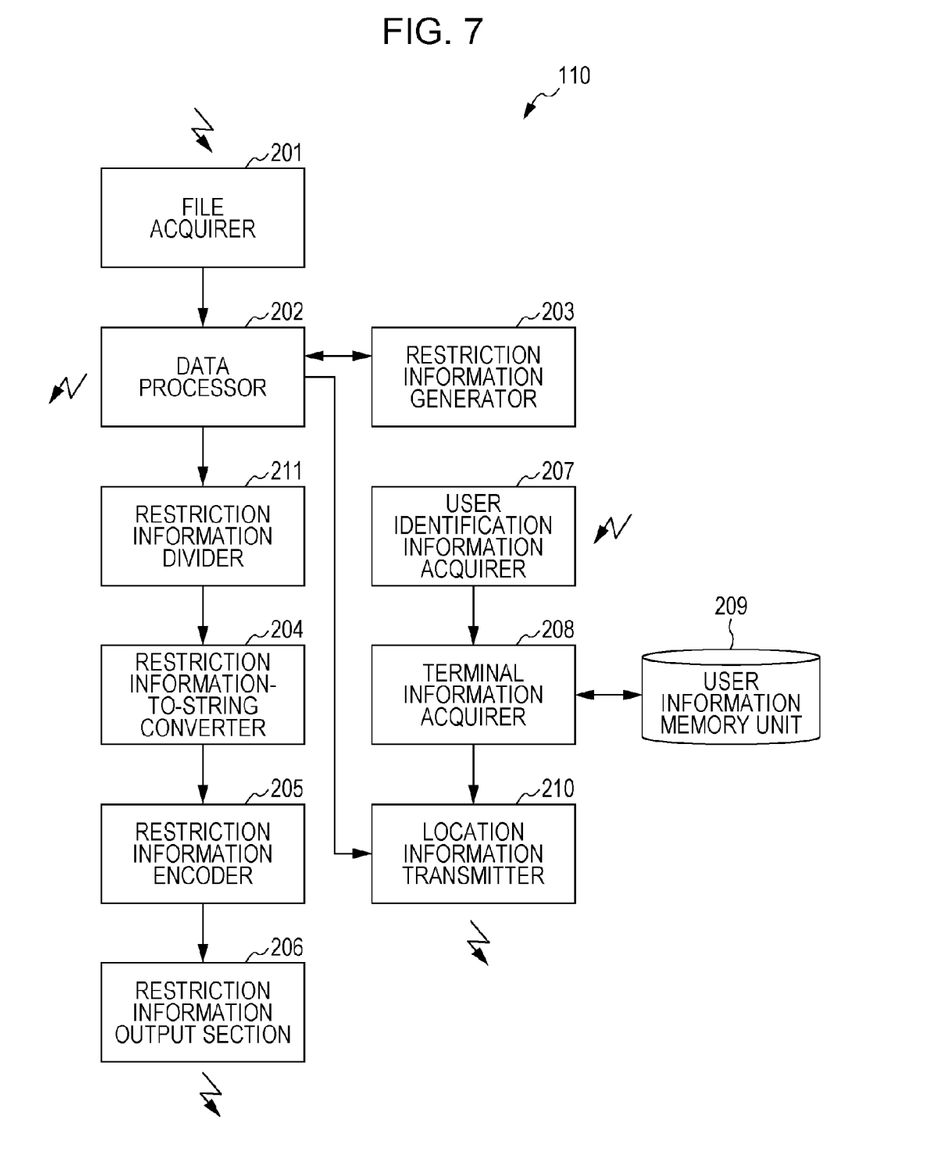
FIG. 7 is a diagram illustrating exemplary functions realized by the information processing apparatus in an exemplary modification.

FIG. 7 is a diagram for description of the functions of the information processing apparatus 110 in the present exemplary modification. The portions different from the functions of the information processing apparatus 110 in the above exemplary embodiment illustrated in FIG. 2 will be mainly described below.

Upon acquisition of the request to generate the encryption key from the data processor 202, the restriction information generator 203 generates one encryption key used for encrypting the file and two dummy keys, which are the encryption keys that are not used for encrypting the file, that is, that are irrelevant to the encryption of the file and supplies all the encryption keys that are generated to the data processor 202.

The data processor 202 encrypts the file supplied from the file acquirer 201 using the encryption key for encrypting the file and supplies all the encryption keys to a restriction information divider 211.

The restriction information divider 211 divides the encryption keys supplied from the data processor 202. In the present exemplary modification, the restriction information divider 211 divides each of the three encryption keys supplied from the data processor 202 into three. Specifically, the restriction information divider 211 divides each encryption key into a first portion, an intermediate portion, and a last portion. The restriction information divider 211 supplies all the encryption keys resulting from the division (nine encryption keys here) to the restriction information-to-string converter 204.

The restriction information-to-string converter 204 converts all the encryption keys supplied from the restriction information divider 211 into character strings. The restriction information-to-string converter 204 supplies all the encryption keys converted into the character strings to the restriction information encoder 205.

The restriction information encoder 205 encodes all the encryption keys converted into the character strings, which are supplied from the restriction information-to-string converter 204. Also in the present exemplary modification, the restriction information encoder 205 converts the encryption keys converted into the character strings into QR codes. The restriction information encoder 205 supplies all the encoded encryption keys to the restriction information output section 206.

The restriction information output section 206 outputs all the encoded encryption keys 302 supplied from the restriction information encoder 205 on the paper medium 301. Specifically, the restriction information output section 206 instructs the printing unit 114 to print all the encoded encryption keys 302 that are arranged.

Figure 8:
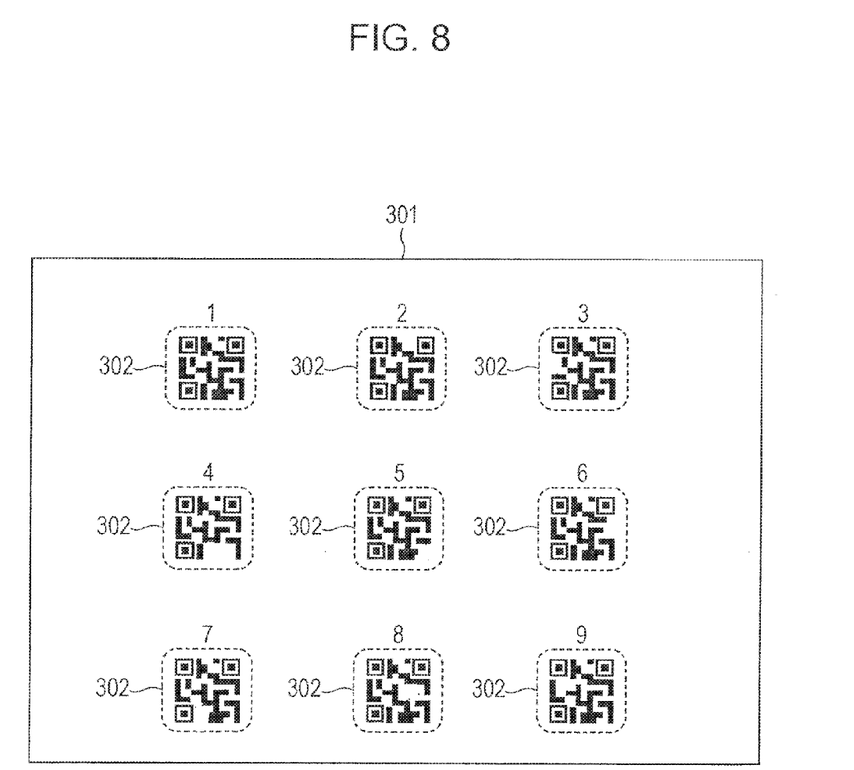
FIG. 8 illustrates exemplary encryption keys output on the paper medium in the exemplary modification.

FIG. 8 illustrates an example of the encryption keys output on the paper medium in the present exemplary modification. As illustrated in FIG. 8, the nine encoded encryption keys 302 (QR codes) to which numbers from one to nine are added are printed on the paper medium 301. As described above, the nine encoded encryption keys 302 are generated by dividing each of one encryption key used for encrypting the file and the two dummy keys that are irrelevant to the encryption of the file into three. Specifically, among the nine QR codes, the three QR codes are generated from the encryption key used for encrypting the file and the remaining six QR codes are generated from the dummy keys irrelevant to the encryption of the file. For example, referring to FIG. 8, the QR code numbered "5" corresponds to the first portion of the one encryption key used for encrypting the file, the QR code numbered "3" corresponds to the intermediate portion of the encryption key used for encrypting the file, and the QR code numbered "9" corresponds to the last portion of the encryption key used for encrypting the file. The paper medium 301 on which the QR codes are printed is acquired by the user operating the information processing apparatus 110 for storage.

The nine QR codes are capable of being arranged with various methods. For example, the nine QR codes may be arranged in accordance with an instruction from the user, which is received with a user interface, such as a touch panel and input keys, provided in the information processing apparatus 110. In this case, for example, when the user operates the touch panel to sequentially input the numbers "5", "3", and "9" corresponding to the positions where the QR codes are arranged as the information for specifying how to arrange the QR codes, the QR code corresponding to the first portion of the encryption key used for encrypting the file is arranged at the position of the number "5" that is first input, the QR code corresponding to the intermediate portion of the encryption key is arranged at the position of the number "3" that is input next, and the QR code corresponding to the last portion of the encryption key is arranged at the position of the number "9" that is input next. The QR codes generated from the dummy keys irrelevant to the encryption of the file are arranged at the positions of the numbers "1", "2", "4", "6", "7", and "8" that are not input. The printing on the paper medium 301 in the restriction information output section 206 may be available after the specification of how to arrange the QR codes is received.

When the positions where the QR codes are arranged and the order of decryption are automatically determined in the information processing apparatus 110, the information processing apparatus 110 may transmit order information indicating the determined order to the user terminal 120. The information processing apparatus 110 may transmit the order information along with the location information (for example, the URL) about the file or may transmit the order information separately from the location information.

The acquisition of the encryption keys in the user terminal 120 in the present exemplary modification will now be described. As described above, among the nine QR codes output on the paper medium 301, the three QR codes are generated from the encryption key used for encrypting the file. The remaining six QR codes are generated from the dummy keys, which are not used for encrypting the file. Accordingly, in capturing of images of the QR codes, it is necessary for the user to capture the images of the three QR codes generated from the encryption key used for encrypting the file, among the nine QR codes, in an order that is desired for the decryption. For example, it is necessary for the user to capture the images of the three QR codes in the order of the first portion, the intermediate portion, and the last portion in the division of one encryption key used for encrypting the file in the restriction information divider 211, that is, in the order of the QR code numbered "5" corresponding to the first portion, the QR code numbered "3" corresponding to the intermediate portion, and the QR code numbered "9" corresponding to the last portion in FIG. 8. The user is capable of acquiring (recognizing) the order of the image capturing for the decryption when the user operates the information processing apparatus 110 (for example, the user operates the information processing apparatus 110 to issue a print instruction).

Upon capturing of the images of the QR codes, the restriction information acquirer 401 decrypts the encryption key from the QR codes the images of which are captured. Specifically, the restriction information acquirer 401 performs the decryption processes for the respective processes performed in the restriction information encoder 205, the restriction information-to-string converter 204, and the restriction information divider 211 in the information processing apparatus 110 to decrypt the encryption key. The correct encryption key is not decrypted in this process unless the images of the three QR codes generated from the encryption key used for encrypting the file are captured in the order desired for the decryption of the encryption key. The processing after the encryption key is decrypted is the same as in the above exemplary embodiment.

According to the present exemplary modification, each of the encryption key used for encrypting the file and the dummy keys irrelevant to the encryption of the file is divided to be output on the paper medium 301. Accordingly, for example, even if the encrypted electronic data (file) and the paper medium 301 on which the information for the decoding is printed are passed to the third party, the information in the file is prevented from leaking unless the third party recognizes the order of the image capturing of the information (the QR codes) printed on the paper medium 301.

The present invention is not limited to the exemplary embodiment described above and the configuration of the exemplary embodiment may be replaced with substantially the same configuration as that in the above exemplary embodiment, the configuration having the same effect and advantage as those of the above exemplary embodiment, or the configuration capable of achieving the same object as that of the above exemplary embodiment. For example, the functional configurations of the information processing apparatus 110 and the user terminal 120 and the processing flows described above are only examples and the present invention is not limited to those.

For example, the encryption key may be generated from a password. In this case, the encryption key is generated from the password with a common method. For example, a hash value is taken using a one-way hash function (for example, sha256) as the password to generate the encryption key. The restriction information is not limited to the encryption key and may be the password. When the restriction information is the password, the data processor 202 may perform a process of protecting the file with the password as the process of associating the restriction information with the file. The password may be input by the user. Alternatively, the ID number of a Subscriber Identity Module (SIM) card, Near Field Communication (NFC), or FeliCa included in the user terminal 120 may be acquired to use the acquired ID number as the password.

For example, the data processor 202 may perform a process of protecting the encryption key with the password acquired in the above manner. The data processor 202 may perform a process of replacing the file name to be associated with the location information and the restriction information with a management number with which the file is uniquely identified. The management number may be output on the paper medium 301 along with the restriction information. The data processor 202 may encrypt the location information (for example, the URL) with the encryption key used for encrypting the file and the location information transmitter 210 may transmit the encrypted location information. In this case, in the user terminal 120, the encrypted location information acquired by the location information acquirer 402 may decoded with the encryption key acquired by the restriction information acquirer 401 to acquire the encrypted file on the basis of the decoded location information.

The conversion of the encryption key into the character string, the encoding of the encryption key, and the division of the encryption key in the above exemplary embodiment are not necessarily performed. For example, any of the conversion of the encryption key into the character string, the encoding of the encryption key, and the division of the encryption key may be performed, any combination of the conversion of the encryption key into the character string, the encoding of the encryption key, and the division of the encryption key may be performed, or none of the conversion of the encryption key into the character string, the encoding of the encryption key, and the division of the encryption key may be performed. For example, the encryption key may be directly encoded. When the encryption key is converted into the QR code, the encryption key may be converted into a character string to be encoded. In the acquisition of the restriction information in the user terminal 120, the user may directly input the restriction information.

When, for example, the nine encoded encryption keys 302 (QR codes) including the dummy keys are generated, the nine encoded encryption keys 302 may be generated from one encryption key for encrypting the file and eight encryption keys that are not used in the encryption of the file.

For example, the data processor 202 may encrypt the file with three encryption keys and the user terminal 120 may acquire the three encryption keys to decode the file. In this case, in the decoding of the file, the three encryption keys may be acquired in random order or it may not be possible to decode the file unless the three encryption keys are acquired in a certain order.

The specification of the arrangement in the printing of the multiple encoded encryption keys 302 may be performed, for example, via the user terminal 120. In this case, upon input of the information (the numbers) for specifying the arrangement into the user terminal 120 by the user with an input device that is composed of a touch panel and input keys and that is included in the user terminal 120, the user terminal 120 may transmit the information for specifying the arrangement to the information processing apparatus 110 over the network. The information processing apparatus 110 may acquire the information for specifying the arrangement, may arrange the multiple encoded encryption keys 302 on the basis of the information, and may output the encryption keys 302 on the paper medium 301. In this case, for example, in the printing of the encoded encryption keys 302, the user may be requested to input the information for specifying the arrangement into the information processing apparatus 110 and, if the input information coincides with the information for specifying the arrangement, the printing of the encoded encryption keys 302 may be performed. In addition, for example, the information for specifying the arrangement may be stored in the user terminal 120 and, if the order of the image capturing when the user terminal 120 acquires the encryption key coincides with the order specified in the information, the acquisition of the restriction information may be accepted.

The decoded file may not be stored in the user terminal 120 and, when the file is updated in the user terminal 120 side, the user terminal 120 may perform the processing similar to that in the information processing apparatus 110 to encrypt the file and the file may be stored in the file server 130.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a memory for storing computer execution instructions; and
a central processing unit (CPU) in communication with the memory, the CPU configured to:
acquire a file on the basis of an instruction from a user;
generate an encryption key for restricting access to the acquired file, and generate for the encryption key, a plurality of dummy encryption keys that are not used for encryption of the acquired file and that are irrelevant to encryption of the acquired file;
encrypt the acquired file using the encryption key;
divide each of the encryption key and the plurality of the dummy encryption keys, respectively, into a plurality of portions;
convert the divided portions into respective character strings;
encode each of the character strings into a visualized code; and
output the encoded character strings arranged in an order on a paper medium,
wherein the order in which the encoded character strings are arranged on the paper medium is a two-dimensional array.

2. The information processing apparatus according to claim 1, wherein the information processing apparatus further comprises a storage, and
wherein the CPU is further configured to:
store the file with which the encryption key is associated in the storage, and
notify a user terminal of location information indicating a location of the file in the storage.

3. The information processing apparatus according to claim 1,
wherein the information processing apparatus further comprises a storage, and
wherein the CPU is further configured to:
store the encrypted file in the storage,
encrypt location information indicating a location of the file in the storage, and
notify a user terminal of the encrypted location information.

4. The information processing apparatus according to claim 1, wherein the CPU is further configured to:
acquire user identification information for identifying the user on the basis of an instruction from the user; and
acquire terminal information associated with the acquired user identification information from a user information memory that stores the user identification information in association with the terminal information,
wherein the CPU generates the encryption key according to the acquired terminal information.

5. The information processing apparatus according to claim 2, wherein the CPU is further configured to:
acquire user identification information for identifying the user on the basis of an instruction from the user; and
acquire terminal information associated with the acquired user identification information from a user information memory that stores the user identification information in association with the terminal information,
wherein the CPU notifies the user terminal of the location information, based on the acquired terminal information.

6. The information processing apparatus according to claim 2, wherein the CPU is further configured to:
acquire user identification information for identifying the user on the basis of an instruction from the user; and
acquire terminal information associated with the acquired user identification information from a user information memory that stores the user identification information in association with the terminal information,
wherein the CPU notifies the user terminal of the file with which the encryption key is associated, based on the acquired terminal information.

7. An information processing system comprising:
an information processing apparatus configured to be used by a user; and
a user terminal configured to be carried by the user and connected to the information processing apparatus over a network,
wherein the information processing apparatus comprises a memory for storing computer execution instructions and a central processing unit (CPU) in communication with the memory, the CPU configured to:
acquire a file on the basis of an instruction from the user;
generate an encryption key for restricting access to the acquired file, and generate for the encryption key, a plurality of dummy encryption keys that are not used for encryption of the acquired file and that are irrelevant to encryption of the acquired file;
encrypt the acquired file using the encryption key;
divide each of the encryption key and the dummy encryption keys, respectively, into a plurality of portions;
convert the divided portions into respective character strings;
encode each of the character strings into a visualized code;
cause the encoded character strings to be output arranged in an order on a paper medium, wherein the order in which the encoded character strings are arranged on the paper medium is a two-dimensional array; and
notify the user terminal of location information indicating a location of the file associated with the encryption key, and
wherein the user terminal comprises a memory for storing computer execution instructions and a central processing unit (CPU) in communication with the memory, the CPU configured to:
acquire the encoded character strings from the paper medium;

receive the location information from the information processing apparatus;

acquire the file associated with the encryption key on the basis of the received location information; and remove the restriction of access to the acquired file on the basis of the acquired encoded character strings.

8. The information processing system according to claim 7, wherein the CPU of the user terminal decodes the acquired file acquired with the encryption key obtained from the acquired encoded character strings.

9. The information processing system according to claim 8, wherein the user terminal comprises a camera, and wherein the CPU of the user terminal acquires the encryption key by capturing an image of the encoded character strings from the paper medium with the camera.

10. A non-transitory computer readable medium storing a program causing a computer to execute a process comprising:

acquiring a file on the basis of an instruction from a user;

generating an encryption key for restricting access to the acquired file, and generating for the encryption key, a plurality of dummy encryption keys that are not used for encryption of the acquired file and that are irrelevant to encryption of the acquired file;

encrypting the acquired file using the encryption key;

dividing each of the encryption key and the dummy encryption keys, respectively, into a plurality of portions;

converting the divided portions into respective character strings;

encoding the character strings into a visualized code; and outputting the encoded character strings arranged in an order on a paper medium, wherein the order in which the encoded character strings are arranged on the paper medium is a two-dimensional array.

11. The information processing apparatus according to claim 1, wherein the dummy encryption keys comprise two dummy encryption keys, and the order in which the encoded character strings are arranged on the paper medium is a 3×3 array.

12. The information processing apparatus according to claim 1, wherein the CPU arranges the encoded character strings in the order based on an arrangement instruction from the user.

13. The information processing apparatus according to claim 12, wherein the arrangement instruction designates locations of the portions of the divided encryption key among the plurality of portions within the order in which the encoded character strings are arranged on the paper medium.

* * * * *